(12) United States Patent
Breuning et al.

(10) Patent No.: US 7,311,033 B2
(45) Date of Patent: Dec. 25, 2007

(54) RETROACTIVE DEVICE

(75) Inventors: Edwin Breuning, Denkendorf (DE); Carmine Cioppi, Wienstadt (DE); Jens Stolzenburg, Ilsfeld (DE)

(73) Assignee: ThyssenKrupp Presta SteerTec GmbH (DE)

( * ) Notice: Subject to any disclaimer, the term of this patent is extended or adjusted under 35 U.S.C. 154(b) by 0 days.

(21) Appl. No.: 10/568,203

(22) PCT Filed: Jun. 29, 2004

(86) PCT No.: PCT/EP2004/007035
§ 371 (c)(1),
(2), (4) Date: Feb. 13, 2006

(87) PCT Pub. No.: WO2005/023624
PCT Pub. Date: Mar. 17, 2005

(65) Prior Publication Data
US 2006/0207821 A1    Sep. 21, 2006

(30) Foreign Application Priority Data
Aug. 13, 2003   (DE) ............................... 103 37 376

(51) Int. Cl.
*B62D 5/083* (2006.01)
*B62D 6/02* (2006.01)
(52) U.S. Cl. ..................... 91/375 A; 180/423
(58) Field of Classification Search .......... 91/375 A, 91/375 R; 180/403, 423
See application file for complete search history.

(56) References Cited
U.S. PATENT DOCUMENTS

| | | | |
|---|---|---|---|
| 4,651,622 A * | 3/1987 | Yoshida | 91/375 R |
| 4,805,714 A * | 2/1989 | Nakamura et al. | 91/375 A |
| 5,016,723 A * | 5/1991 | Sano | 91/375 A |
| 5,070,958 A | 12/1991 | Goodrich, Jr. et al. | |
| 5,339,917 A * | 8/1994 | Eberhart | 91/375 A |
| 5,517,899 A | 5/1996 | Bohner | |
| 5,823,090 A * | 10/1998 | Kawamuro | 91/375 A |
| 6,009,903 A | 1/2000 | Rohringer et al. | |

FOREIGN PATENT DOCUMENTS

| | | |
|---|---|---|
| EP | 0 818 380 | 1/1998 |
| EP | 0 930 217 | 7/1999 |
| JP | 61 291270 | 12/1986 |
| JP | 62 152973 | 7/1987 |
| JP | 62 99262 | 10/1994 |

* cited by examiner

*Primary Examiner*—Thomas E. Lazo
(74) *Attorney, Agent, or Firm*—Robert W. Becker; Robert W. Becker & Associates

(57) ABSTRACT

A retroactive device as part of a hydraulic servo-steering system that also includes a hydraulic servo-valve device, the retroactive device comprising an arrangement for hydraulically producing a restoring moment into a central position that produces the restoring moment as a function of the pressure differential between a pressure side and a low-pressure side. The system has at least one valve arrangement that, when pressure is applied in the central position of the servo-valve, is adapted to produce a pressure differential between the external and internal chambers of the valve. The valve arrangement is disposed hydraulically in series with the retroactive device.

15 Claims, 5 Drawing Sheets

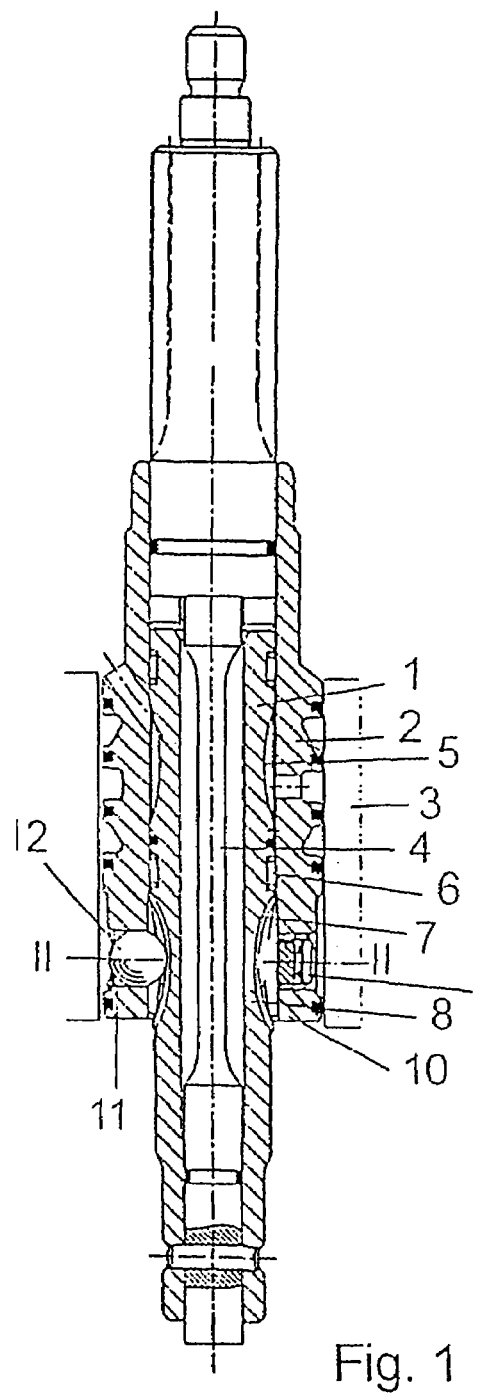
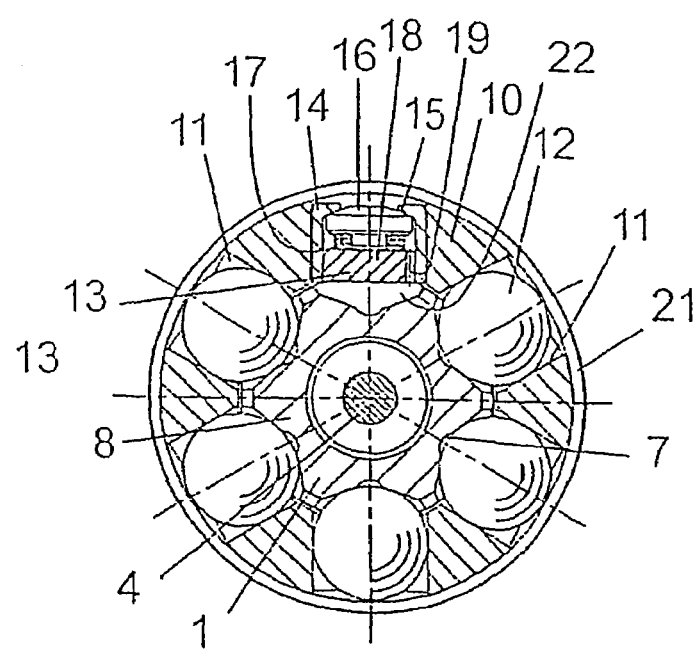
Fig. 1
STATE OF THE ART
Fig. 2
STATE OF THE ART

US 7,311,033 B2

RETROACTIVE DEVICE

This specification for the instant application should be granted the priority date of Aug. 13, 2003, the filing date of the corresponding German patent application 103 37 376.4 as well as the priority date of 29 Jun. 2004, the filing date of the corresponding International patent application PCT/EP2004/007035.

BACKGROUND OF THE INVENTION

The present invention relates to a retroactive device as part of a hydraulic servo-steering system that also includes a hydraulic servo-valve device, in particular for motor vehicles.

A device of this type is known from DE 19616439 C1. In the case of the known device, an additional, controllable restoring force is exerted onto the steering column, and therefore the steering wheel, of a motor vehicle, on deflection of the servo-valve device, in that spherical retroactive elements are pushed into V-shaped grooves by a controllable hydraulic force. In the central position, which, in the case of a motor vehicle servo-steering system, substantially corresponds to driving straight ahead with no steering torque, the restoring elements are not hydraulically acted on. This central position, which partly determines the driving feel of a motor vehicle, is, in principle, determined by the restoring force of the torsion bar of the servo-valve device. In the generic prior art, provision is made for a flat coil spring, which externally embraces the retroactive elements, to be provided for mechanically, resiliently biasing the retroactive elements into the grooves if the central position is not sufficiently defined by the rigidity of the torsion bar alone. This solution, in which the servo-valve device is subjected in the central position to a mechanical basic load, is, in practice, unsatisfactory. The generic prior art therefore proposes exerting a hydraulic basic load in that a biased one-way valve is arranged hydraulically parallel to the retroactive elements. This arrangement produces a pressure differential between an internal chamber and an external chamber of the retroactive device. Although this solution is provided for servo-steering systems comprising hydraulic pumps with a constant output flow, it may not be used for hydraulic pumps having a variably controlled output flow, since the retroaction would vary with the output flow.

Other retroactive devices are known from U.S. Pat. Nos. 5,046,573, 5,070,958 and 5,517,899. In the case of these devices, the retroactive moment is exerted by profile members, which extend in the axial direction of the rotary slide valve and into which the retroactive elements are pushed hydraulically in the axial direction. In the first two documents, the basic load is applied by means of a helical spring and a slide arranged between the pressure-side external chamber and the low pressure-side internal chamber. The slide is configured as a floating piston, which is movable in the axial direction and is adjacent, on the one hand, to the retroactive elements and, on the other hand, to the helical spring. The force of the helical spring is additive to the hydraulic force acting on the slide, and thus on the retroactive device. There is no hydraulic basic load. This solution, in which the servo-valve device is subjected in the central position to a mechanical basic load, is also, in practice, unsatisfactory.

The object of the present invention is therefore to improve the known retroactive device in such a way that a controllable or adjustable basic load may be exerted even with a varying output flow.

SUMMARY OF THE INVENTION

This object is achieved by a retroactive device having means for hydraulically producing a restoring moment into a central position that produces the restoring moment as a function of the pressure differential between a pressure side and a low-pressure side; the hydraulic servo-steering system further has at least one valve means that, when pressure is applied in the central position of the servo-valve, is adapted to produce a pressure differential between the external chamber and the internal chamber of the valve, wherein the at least one valve means is disposed hydraulically in series with the retroactive device.

Because the at least one valve means is arranged hydraulically in series with the retroactive device, a hydraulic basic load, the extent of which is independent of the output volume of the servo-pump, may be produced in the central position of the servo-valve.

The valve means is advantageously an electrically controlled proportional valve, since this allows the basic load to be adjusted using a control means.

The valve may have a circular cylindrical housing, which comprises a valve member, a valve seat and the helical screw and which has a fluid channel. The valve may thus be pre-manufactured and used as a separate component.

A steering characteristic felt to be advantageous is obtained if at least two fluid channels, which are opened, one after the other, as the pressure differential between the external chamber and the internal chamber increases, are provided.

Advantageous parameters for a car steering system are provided if the pressure differential in the region of the central position of the servo-valve is approximately 5 to 10 bar, but at least 2 bar, wherein, for output flows between 2 l/min and 9 l/min, it should be possible to achieve any pressure differential in the abovementioned range.

BRIEF DESCRIPTION OF THE DRAWINGS

An embodiment of the present invention will be described below in greater detail with reference to the drawings, in which:

FIG. 1 is a cross section, in the longitudinal direction, through a servo-valve device according to the prior art;

FIG. 2 is a cross section, along the line II-II, through the servo-valve device of FIG. 1;

DESCRIPTION OF SPECIFIC EMBODIMENTS

Figure 3:
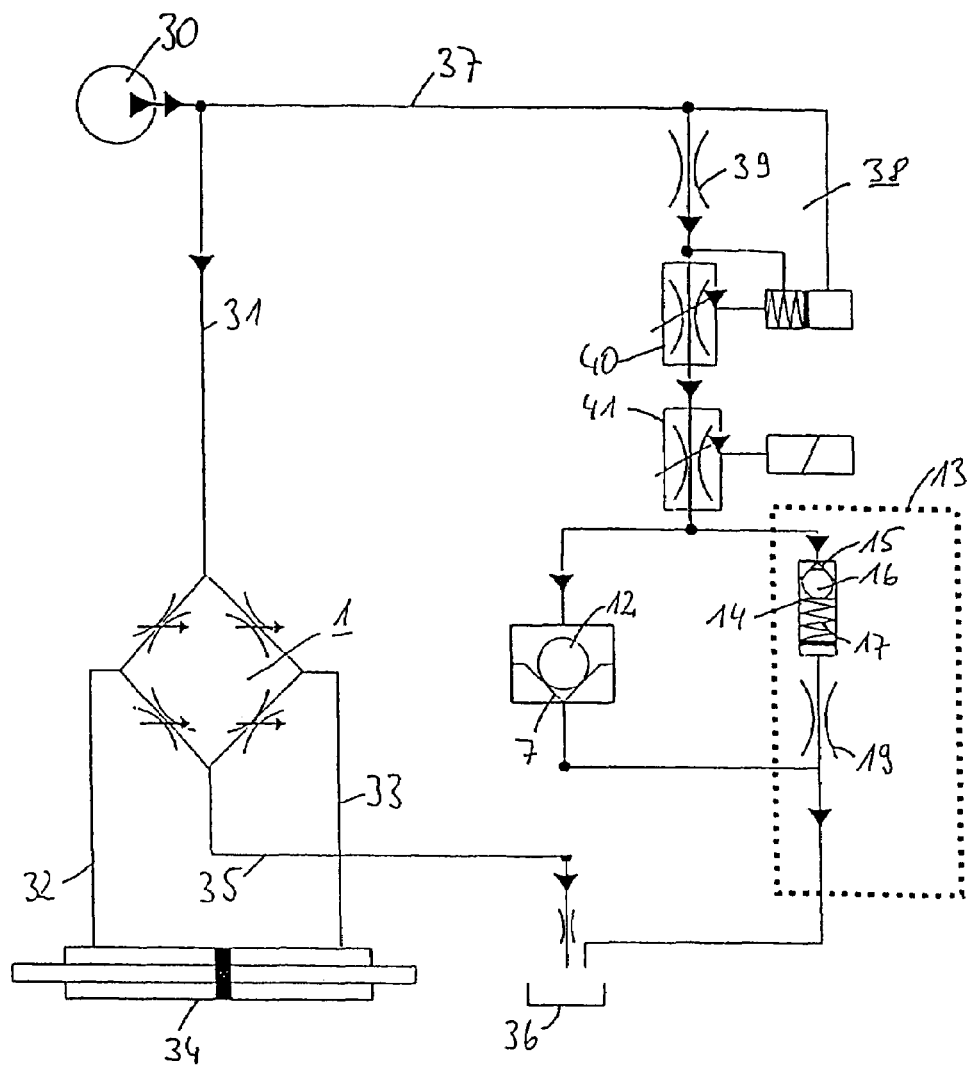
FIG. 3 is a hydraulic circuit diagram of a servo-valve device according to the invention.

FIG. 1 is a cross section, along the longitudinal axis, of a servo-valve device according to the generic prior art. A rotary slide 1 is encompassed coaxially by a control bush or sleeve 2, which is rotatably mounted within an indicated valve housing 3. The rotary slide 1 and the control bush 2 may be rotated relative to one another to a limited extent, counter to the resilience of a torsion bar 4, cooperating axial control edges 5, which are arranged on the rotary slide 1 or the control bush 2, being adjusted relative to one another. A pressure differential, which provides the assisting auxiliary steering force of a servo-steering system, is thus produced, in a manner known per se, between two connections of a hydraulic actuating drive.

In FIG. 1, the rotary slide 1 comprises, below a seal 6, a shaft portion 8, which is provided with grooves 7 that are V-shaped in cross section and is surrounded by a second bush portion 10. The bush portion 10 comprises in total six bores 11, which are arranged rotationally symmetrically about the rotary slide 1 and in some of which retroactive elements 12 are arranged. A valve 13 is arranged in one of the bores 11. This region is illustrated in greater detail in FIG. 2.

FIG. 2 is an enlarged cross section along the line II-II of FIG. 1.

The valve 13 comprises a rotationally symmetrical, circular cylindrical housing 14, in which a valve seat 15 is configured in one piece. A movable valve member 16 is pushed against the valve seat 15 by a helical spring 17. The helical spring 17, for its part, is supported against a counter-bearing 18, which is rigidly connected to the housing 14 and holds a fluid channel 19.

The valve 13, in conjunction with the retroactive elements 12, separates an external hydraulic chamber 21 from an internal hydraulic chamber 22.

During operation, an operating pressure, which acts on the retroactive elements 12, is applied to the external chamber 21 via a control means (not shown) from the pressure side of a hydraulic pump (also not shown). On deflection of the rotary slide valve from the illustrated central position, the pressure differential produced between the external chamber 21 and the internal chamber 22 causes, in conjunction with the cross sectional surface of the retroactive elements 12 and the configuration of the grooves 7, a restoring force. In the central position illustrated in FIG. 2, the pressure differential causes a retention force, since all of the retroactive elements 12 are, in each case, adjacent to both sides of the grooves 7 and, in the event of any rotation of the rotary slide 1 with respect to the control bush 2, this hydraulic force has to be countered.

FIG. 3 is a schematic illustration of the hydraulic circuit diagram of a servo-steering system according to the invention comprising a valve device arranged parallel to the servo-valve. A hydraulic pump 30, shown in this figure for the first time, feeds the rotary slide valve 1, which is, in turn, connected via feed lines 32 and 33 to the working chambers of a servo-steering system 34, via a first hydraulic line 31. A return means 35 leads the hydraulic fluid, which leaves the rotary slide 1 substantially without pressure, back into a reservoir 36.

A second hydraulic line 37, which is also fed directly by the hydraulic pump 30, supplies hydraulic fluid with the pressure applied at this location to the valve device shown on the right-hand side of FIG. 3. This device comprises a cut-off control slide 38, which comprises a throttling port 39 and a cut-off valve 40. From this location, the hydraulic fluid is guided by a proportional valve 41 and reaches the retroactive elements 12 and, parallel thereto, the valve 13, which is indicated in this figure in its entirety by a dotted line. The individual components of the valve 13 are illustrated schematically. It comprises, as described above, the valve housing 14, the valve seat 15, the movable valve member 16, the helical spring 17 and, downstream thereto in the direction of flow, the fluid channel 19.

The pressureless side both of the retroactive device, comprising the spheres 12 and the V-shaped grooves 7, and of the valve 13 leads into the reservoir 36.

In this arrangement, as described above, the hydraulic basic load is produced in that the primary pressure of the hydraulic pump 30 is applied to the retroactive elements 12, and the degree of said pressure is limited by the valve 13.

The cut-off control slide 38, comprising its throttling port 39 and the cut-off valve 40, ensures that the hydraulic pressure acting on the retroactive elements 12 ceases to be applied if the pressure of the hydraulic pump 30 becomes too great. The cut-off pressure may be selected by means of the spring constant of the cut-off valve 40 and the size of the throttling port 39. The proportional valve 41 is capable of electrically controlling the extent of the restoring force.

Figure 4:
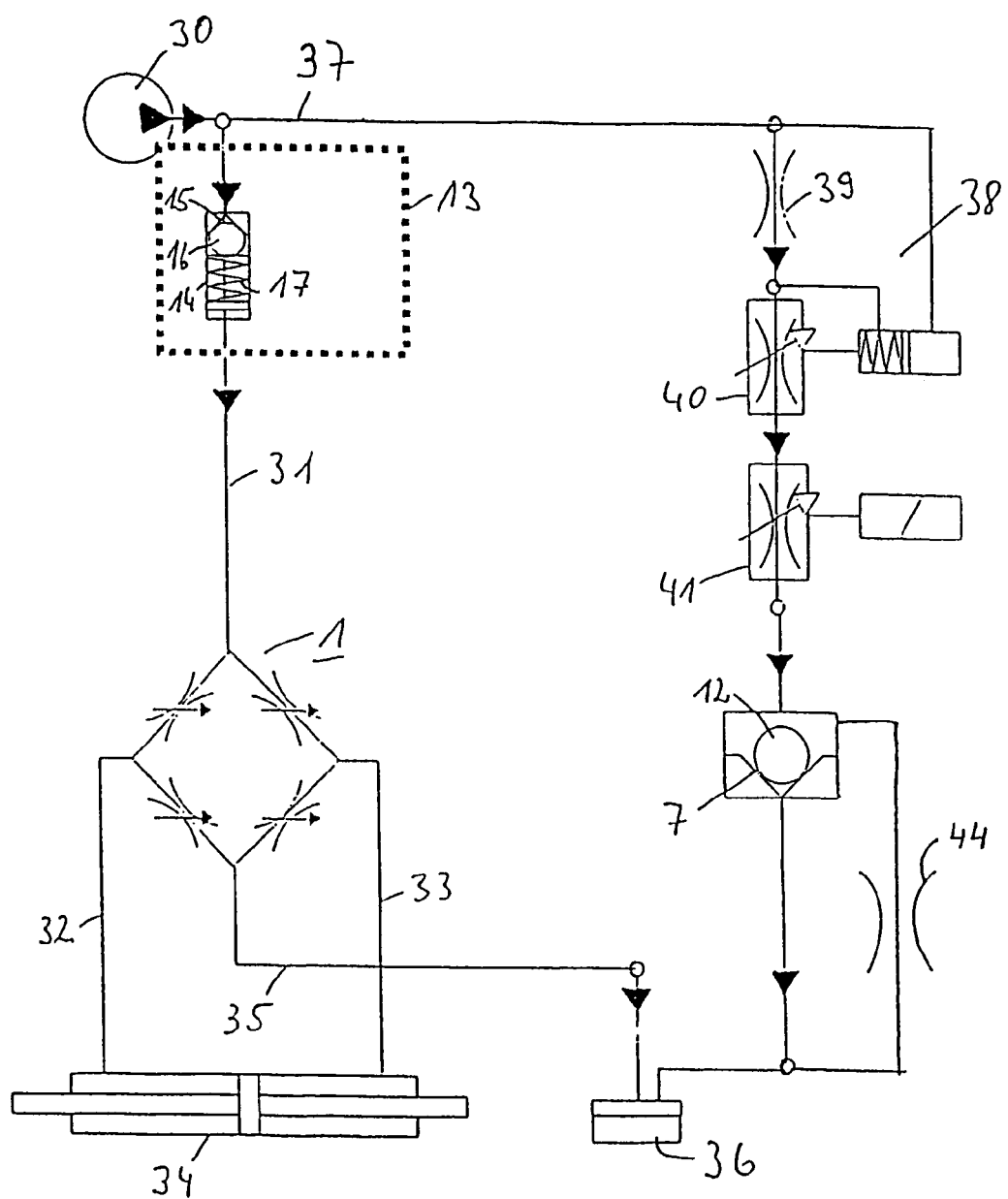
FIG. 4 is a circuit diagram in which a check valve is arranged in the feed line of the rotary slide valve.

FIG. 4 shows another embodiment of the hydraulic circuit diagram. Identical reference numerals denote identical components.

In this embodiment, the valve 13 is inserted in the hydraulic line 31 between the pump 30 and the rotary slide valve 1.

As the rotary slide valve 1 is an open-center valve, a continuous stream of hydraulic fluid flows through the rotary slide valve 1 from the line 31 to the line 35, and therefore into the reservoir 36. The valve 13 causes a hydraulic pressure, which is then applied in the hydraulic line 37, to build up on the pressure side before the valve 13. The hydraulic line 37, as already described above, leads to the cut-off control slide 38 and the proportional valve 41, which are provided for the limiting of pressure or the degree of pressure acting on the retroactive element 12. A throttling port 44 is provided parallel to the retroactive element 12 and its V-shaped working groove 7. This throttling port supplies a continuous hydraulic stream parallel to the retroactive elements 12. A defined leakage stream, which eliminates tolerances in the fit of the retroactive elements 12, located in the bores 11, with respect to their hydraulic action, is thus produced.

Figure 5:
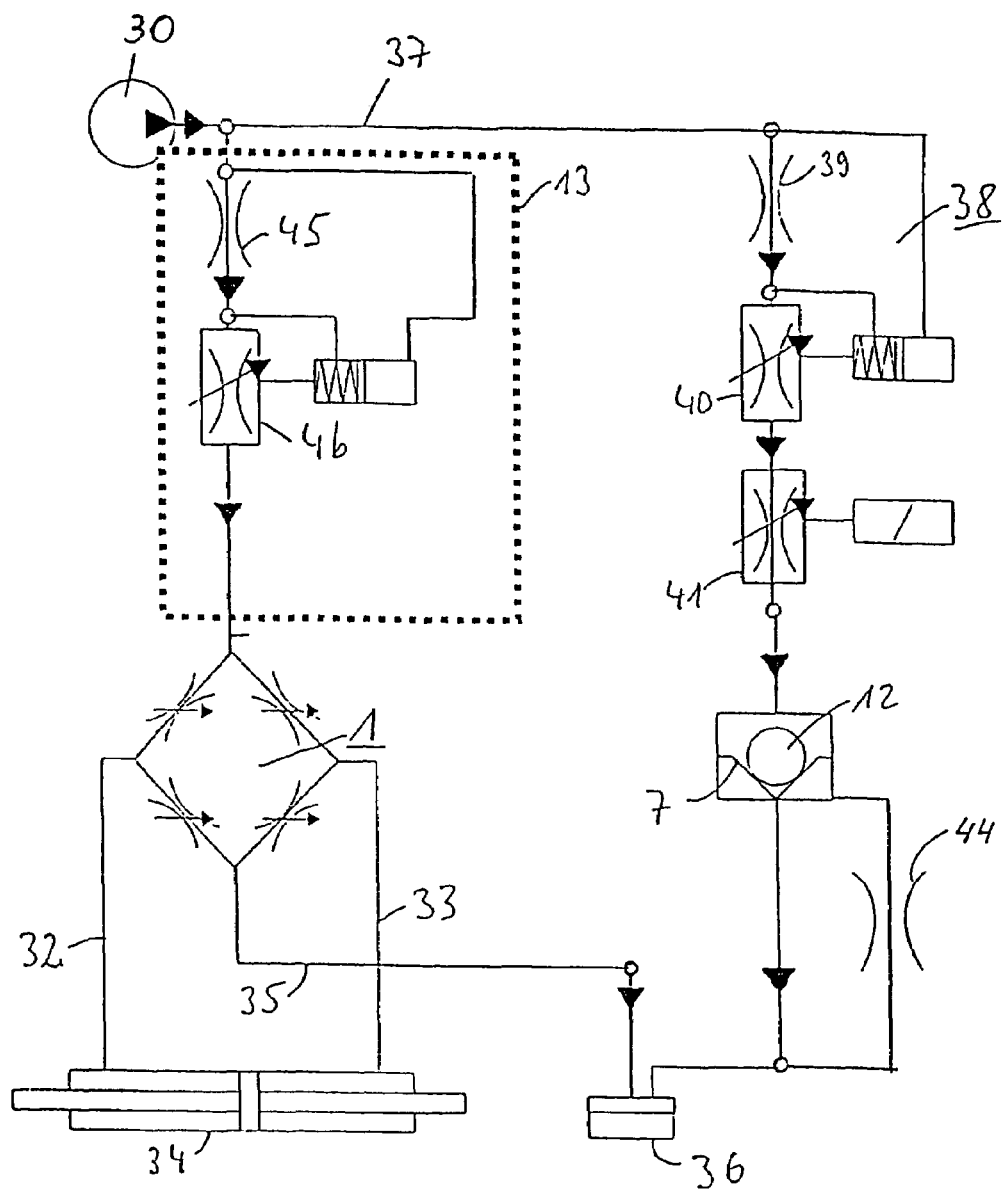
FIG. 5 is a hydraulic circuit diagram corresponding to FIG. 4, in which the check valve is replaced by a pilot valve flowed against via an orifice plate.

FIG. 5, in turn, is a hydraulic circuit diagram similar to FIG. 4. In this embodiment, the valve 13 is configured as a hydraulically pilot-controlled pressure control valve. The cross section of the valve 13 is controlled by means of the pilot valve 46 via the hydraulic pressure applied before a bore 45. The function of the device according to FIG. 5 corresponds to that according to FIG. 4. However, a constant admission pressure in the hydraulic line 37 is ensured by the rotary slide valve 1 over a broader range of possible flow rates than would be the case in FIG. 4.

Figure 6:
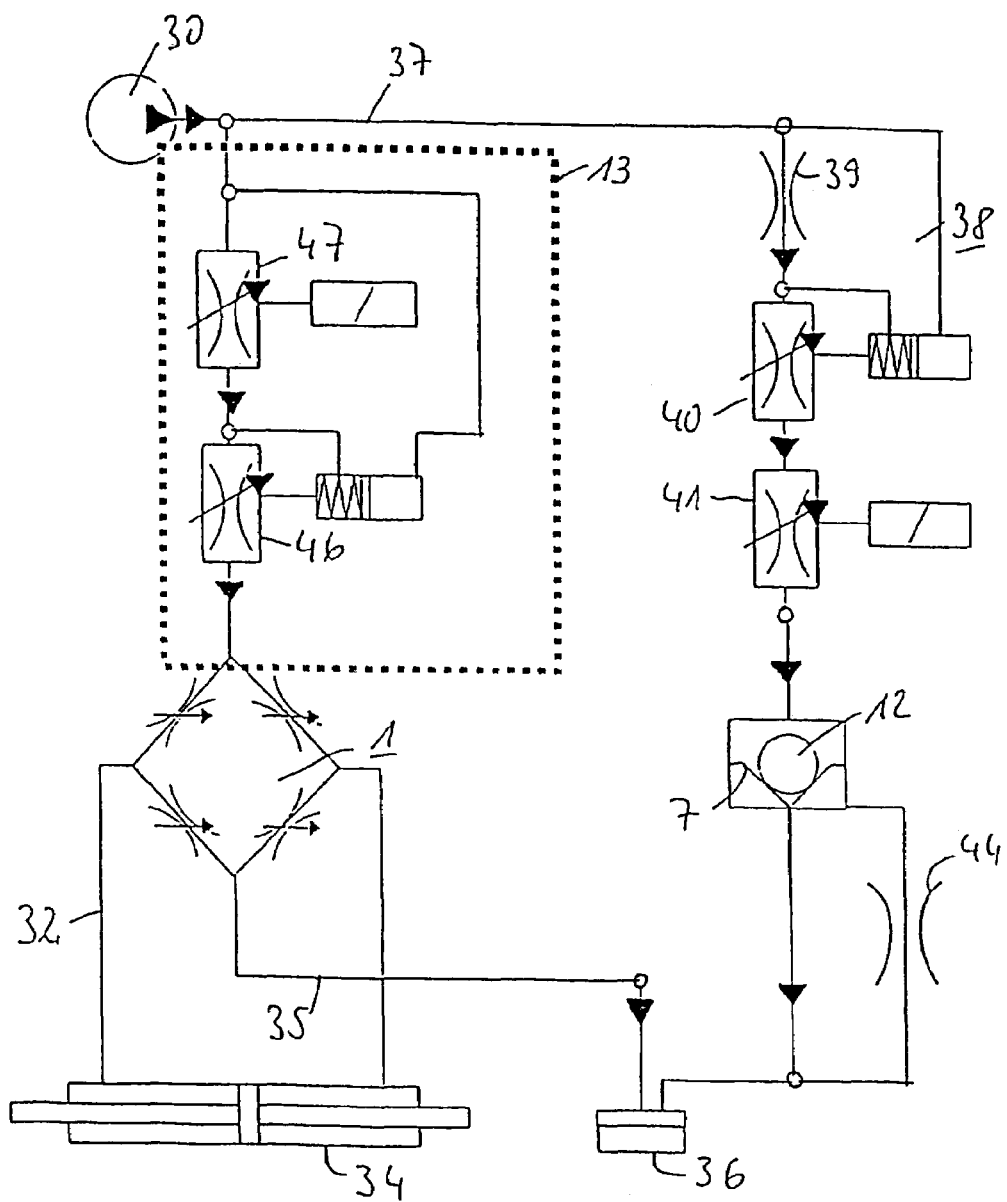
FIG. 6 is a hydraulic circuit diagram according to FIGS. 4 and 5 comprising an electrically controlled pilot valve.

FIG. 6 illustrates a further improved embodiment. In this case, the valve 13 is configured as an electrically pilot-controlled pressure control valve. An electrically activatable proportional valve 47 adjusts the primary pressure entering the hydraulic line 37 from the pump 30, which pressure acts on the control side of the pilot valve 46. The pressure in the hydraulic line 37, and therefore before the valve device 38, may thus be controlled via the electrical proportional valve 47. The restoring force of the servo-steering system may thus be controlled in accordance with the operating state of the motor vehicle. In a corresponding configuration of the electronics (not shown), the degree of the restoring forces may also be selected by the driver. The "driving feel" that a correspondingly configured servo-steering system imparts to the driver is then adjustable and selectable.

The hydraulic layout illustrated in FIGS. 4 to 6 also allows the retroaction exerted onto the steering wheel via the retroactive elements 12 and the rotary slide to be controlled or adjusted substantially independently of the capacity of the hydraulic pump 30. The capacity of the pump, which, in the case of conventional open-center steering systems, is substantially constant, may, in steering systems according to FIGS. 4 to 6, be controlled as required without the restoring moment decreasing in an undesirable manner. A means of this type for controlling the capacity of the pump 30 is advantageous for reducing fuel consumption if little or no servo-assistance is required for driving straight ahead. However, the retroaction has to be particularly great in precisely such circumstances. This is facilitated by the valve devices of FIGS. 4 to 6.

In practice, a servo-steering system equipped with a retroactive device corresponding to the present invention imparts an advantageous driving feel even if controlled hydraulic pumps are used.

The retroactive device may, in particular, also be used in the servo-steering systems specified at the outset as pertaining to the prior art.

The specification incorporates by reference the disclosure of German priority document 103 37 376.4 filed Aug. 13, 2003 and PCT/EP2004/007035 filed 29 Jun. 2004.

The present invention is, of course, in no way restricted to the specific disclosure of the specification and drawings, but also encompasses any modifications within the scope of the appended claims.

The invention claimed is:

1. A hydraulic power steering system for motor vehicles, comprising:
 a hydraulic servo-valve device;
 a retroactive device, wherein said retroactive device comprises means for hydraulically producing a restoring moment into a central position, which produces the restoring moment as a function of the pressure differential between a pressure side and a low-pressure side;
 a hydraulic power-steering pump, wherein said hydraulic power-steering pump supplies the servo-valve device via a first hydraulic line and supplies the retroactive device via a second hydraulic line, and
 wherein said system further comprises at least one valve means that, when pressure is applied in the central position of the servo-valve, is adapted to produce a pressure differential between an external chamber and an internal chamber of said valve means, wherein said at least one valve means is a pressure regulating valve that is disposed in series with the servo-valve device in the first hydraulic line, and wherein a pressure control valve and a proportional valve are disposed hydraulically in series with the retroactive device in the second hydraulic line.

2. The hydraulic power steering system of claim 1, wherein said means for producing a restoring moment comprises a grooved device disposed on the side of a rotary slide and a bush portion disposed on the side of a control bush, wherein said bush portion separates said external chamber from said internal chamber, and wherein said bush portion is provided with radial guides for retroactive elements that, under a hydraulic pressure acting radially from said external chamber on deflection of said servo-valve device out of a central position, are adapted to be urged into grooves of said grooved device for achieving a retroactive torque.

3. The hydraulic power steering system of claim 1, wherein said at least one valve means is an electrically controlled proportional valve.

4. The hydraulic power steering system according to claim 1, wherein said at least one valve means is provided with a cylindrical housing that includes a valve member, a valve seat, and a helical spring and is furthermore provided with a fluid channel.

5. The hydraulic power steering system according to claim 1, wherein at least two fluid channels are provided that open one after the other as the pressure differential between the external chamber and the internal chamber increases.

6. The hydraulic power steering system according to claim 1, wherein the pressure differential during operation in the central position of the servo-valve is at least 2 bar.

7. The hydraulic power steering system according to claim 6, wherein the pressure differential during operation in the central position of the servo-valve is approximately 5-10 bar.

8. The hydraulic power steering system according to claim 1, wherein said at least one valve means is a hydraulically pilot-controlled pressure control valve.

9. The hydraulic power steering system according to claim 1, wherein said at least one valve means is an electrically pilot-controlled pressure control valve.

10. The hydraulic power steering system according to claim 1, wherein a pressure limiting means precedes said retroactive elements.

11. The hydraulic power steering system according to claim 10, wherein said pressure limiting means is a cut-off control slide.

12. The hydraulic power steering system according to claim 1, wherein an electrically activatable proportional valve precedes said retroactive elements.

13. A hydraulic servo-steering system comprising a hydraulic servo-valve device and a retroactive device, wherein said retroactive device comprises means, for hydraulically producing a restoring moment into a central position, that produces the restoring moment as a function of the pressure differential between a pressure side and a low-pressure side; and wherein said system further comprises at least one valve means that; when pressure is applied in the central position of the servo-valve, is adapted to produce a pressure differential between an external chamber and an internal chamber of said valve means, wherein said at least one valve means is disposed hydraulically in series with said retroactive device, wherein at least two fluid channels are provided that open one after the other as the pressure differential between the external chamber and the internal chamber increases.

14. A hydraulic servo-steering system comprising a hydraulic servo-valve device and a retroactive device, wherein said retroactive device comprises means, for hydraulically producing a restoring moment into a central position, that produces the restoring moment as a function of the pressure differential between a pressure side and a low-pressure side; and wherein said system further comprises at least one valve means that, when pressure is applied in the central position of the servo-valve, is adapted to produce a pressure differential between an external chamber and an internal chamber of said valve means, wherein said at least one valve means is disposed hydraulically in series with said retroactive device, wherein a pressure limiting means precedes said retroactive elements.

15. A hydraulic servo-steering system comprising a hydraulic servo-valve device and a retroactive device, wherein said retroactive device comprises means, for hydraulically producing a restoring moment into a central position, that produces the restoring moment as a function of the pressure differential between a pressure side and a low-pressure side; and wherein said system further comprises at least one valve means that, when pressure is applied in the central position of the servo-valve, is adapted to produce a pressure differential between an external chamber and an internal chamber of said valve means, wherein said at least one valve means is disposed hydraulically in series with said retroactive device, wherein said pressure limiting means is a cut-off control slide.

* * * * *